UNITED STATES PATENT OFFICE.

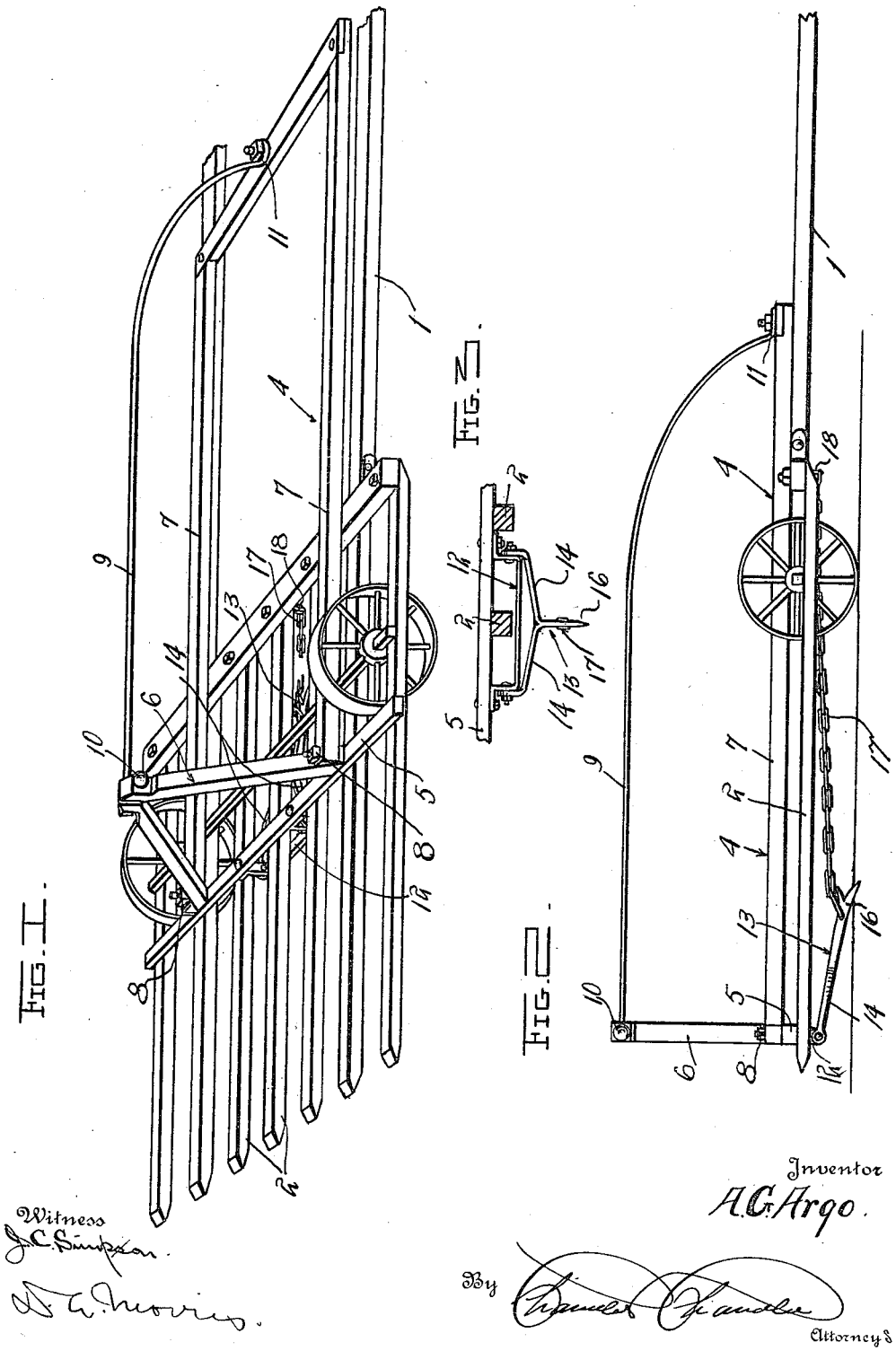
A. G. ARGO.
ATTACHMENT FOR HAY RAKES.
APPLICATION FILED NOV. 27, 1916.
1,272,885.
Patented July 16, 1918.

ALFRED G. ARGO, OF KENESAW, NEBRASKA.

ATTACHMENT FOR HAY-RAKES.

1,272,885.

Specification of Letters Patent. Patented July 16, 1918.

Application filed November 27, 1916. Serial No. 133,687.

*To all whom it may concern:*

Be it known that I, ALFRED G. ARGO, a citizen of the United States, residing at Kenesaw, in the county of Adams, State of Nebraska, have invented certain new and useful Improvements in Attachments for Hay-Rakes; and I do hereby declare the following to be a full, clear, and exact description of the invention, such as will enable others skilled in the art to which it appertains to make and use the same.

This invention relates to an attachment for hay rakes.

An object of the invention resides in the provision of an improved attachment for pushing the hay from the sweep.

A further object of the invention resides in so constructing the device that it will be in such position that it will not interfere with the operation of the sweep.

A further object of the invention resides in so constructing the device that its action will be automatic and so that it may be applied to the sweeps used at the present time.

With these and other objects in view, such as will appear as my description progresses, my invention comprises the combination and arrangement of parts as set forth in and falling within the scope of the appended claim.

In the drawing:

Figure 1 is a perspective view of a device constructed in accordance with my invention showing the same applied to a rake, only a portion of the latter being shown however;

Fig. 2 is a detail showing the positions of the parts when the hay is being pushed from the sweep, and Fig. 3 is a fragmental sectional view.

In the drawing, I have illustrated only a portion of a rake which includes a frame 1 having a plurality of sweep teeth 2 thereon.

In order that the hay may be pushed from the teeth 2 of the sweep, I have provided a rectangular frame 4 which is slidable on the upper faces of the teeth 2. Secured to the front bar 5 of this frame 4 is a vertically extending inverted V-shaped pusher member 6 to which the side bars 7 of the frame 4 are secured by means of bolts 8. This pusher member 6 is braced by means of a suitable brace 9 which is secured to the upper end thereof by the bolt 10 and is secured to the frame 4, at 11. Secured to and depending from the front bar 5 is a U-shaped member 12 to which a trip member 13 is pivoted. This trip member is provided with arms 14 which are pivoted to the legs of the U-shaped member 12. The free end of this trip member 13 is provided with a forked portion 16 of substantially fish tail shape which is adapted to penetrate the ground. A chain 17 is secured to the trip member 13 and to the sweep, at 18. The trip member 13 is so arranged that it will extend downwardly between the teeth 2 of the sweep and will engage the ground. It of course will be apparent that when the chain 17 is slack it is possible to swing the trip member 13 forwardly of the hay rake to engage the ground and thereby block the advancement of the wheeled frame of said rake so that the tines 2 of the latter can be forced into the straw or hay and when it is desired to eject a load the trip member can be reversed on its pivotal axis to extend backwardly and penetrate the ground for holding the frame stationary so that the tines or teeth of the rake can be moved rearwardly and the hay pushed therefrom.

In operation when the sweep is moving forwardly to gather the hay the trip member 13 will engage the ground but will ride idly thereover. When, however, the sweep is moved backwardly the forked portion 16 of the trip member will penetrate the ground and cause the frame 4 together with the pusher member 6 to remain stationary so that the teeth will be moved rearwardly and consequently the hay will be pushed therefrom. When, however, the teeth have moved a sufficient distance to be freed from hay the chain 17, having a force exerted thereon by the sweep, will draw the trip member upwardly and consequently it will not become broken.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:—

The combination with a sweep rake having a hay ejector, of a U shaped bracket fixed transversely to the ejector medially thereof, and a substantially Y shaped trip member having a fish tail shaped ground engaging end and the opposite arm ends pivotally connected to the sides of said bracket for free vertical swinging movement, and a flexible connection joined at one end to the rear end of said rake and at its opposite end to the trip member near its fish tail shaped end for the automatic engagement of the latter end in the ground and its disengagement therefrom on movements of the ejector.

In testimony whereof, I affix my signature in the presence of two witnesses.

ALFRED G. ARGO.

Witnesses:
W. M. SWINYER,
WILLIE LIESINGER.

Copies of this patent may be obtained for five cents each, by addressing the "Commissioner of Patents Washington, D. C."